(12) United States Patent
Banks et al.

(10) Patent No.: US 8,990,326 B2
(45) Date of Patent: Mar. 24, 2015

(54) COMMUNICATIONS SYSTEM (75) Inventors: Robert Edward Banks, Berkshire (GB); Karen Jude, Berkshire (GB)

(73) Assignee: Vodafone IP Licensing Limited, Berkshire (GB)

( * ) Notice: Subject to any disclaimer, the term of this patent is extended or adjusted under 35 U.S.C. 154(b) by 188 days.

(21) Appl. No.: 13/486,452

(22) Filed: Jun. 1, 2012

(65) Prior Publication Data
US 2012/0311051 A1  Dec. 6, 2012

(30) Foreign Application Priority Data
Jun. 3, 2011 (GB) .................................. 1109312.7

(51) Int. Cl.
G06F 15/16 (2006.01)
H04W 4/14 (2009.01)
H04L 29/06 (2006.01)
H04W 88/16 (2009.01)
H04L 29/08 (2006.01)

(52) U.S. Cl.
CPC ................ H04W 4/14 (2013.01); H04W 88/16 (2013.01); H04L 67/02 (2013.01); H04L 69/08 (2013.01)
USPC ......................................... 709/206; 709/238

(58) Field of Classification Search
USPC ................ 709/201–206, 220, 223, 238, 239; 455/411, 418, 558
See application file for complete search history.

(56) References Cited

U.S. PATENT DOCUMENTS

| | | | |
|---|---|---|---|
| 7,701,969 B2* | 4/2010 | Carrigan et al. | 370/466 |
| 7,707,401 B2* | 4/2010 | Miller et al. | 713/153 |
| 8,326,265 B2* | 12/2012 | Nooren | 455/410 |
| 8,447,266 B2* | 5/2013 | Smelov et al. | 455/404.2 |
| 8,605,870 B2* | 12/2013 | Moraes | 379/88.25 |
| 8,874,120 B1* | 10/2014 | Tian et al. | 455/445 |
| 2004/0223605 A1* | 11/2004 | Donnelly | 379/373.01 |
| 2004/0258238 A1* | 12/2004 | Wong | 379/900 |
| 2005/0107100 A1 | 5/2005 | Gustafsson et al. | 455/466 |

(Continued)

FOREIGN PATENT DOCUMENTS

WO  2010/001276  1/2010

OTHER PUBLICATIONS

Extended European Search Report issued Nov. 28, 2012 in counterpart application No. 12275083.9 (4 pages).

*Primary Examiner* — Sargon Nano
(74) *Attorney, Agent, or Firm* — Kratz, Quintos & Hanson, LLP (57) ABSTRACT

There is provided a system for facilitating communications over a telecommunications network, the system comprising a data communications device having a unique identifier, the device adapted to generate information elements comprising machine information, the information elements conforming to a first message protocol, the first message protocol being a session-based message protocol. The system further comprises a network subsystem to provide an interface for communication with a plurality of entities. The network subsystem is adapted to receive the information elements and extract the machine information, generate an output message comprising the machine information, the message conforming to a second message protocol different from the first message protocol, and, forward the message to a specific entity of the plurality of entities in dependence on the unique identifier of the data communications device. The data communications device may be a cellular data communications device. An associated method is also provided.

20 Claims, 5 Drawing Sheets

(56) References Cited

U.S. PATENT DOCUMENTS

| | | | |
|---|---|---|---|
| 2005/0283497 A1* | 12/2005 | Nurminen et al. | 707/104.1 |
| 2007/0061397 A1* | 3/2007 | Gregorat et al. | 709/203 |
| 2007/0135101 A1* | 6/2007 | Ramati et al. | 455/414.1 |
| 2008/0132248 A1* | 6/2008 | Wahlstrom | 455/456.2 |
| 2008/0162637 A1* | 7/2008 | Adamczyk et al. | 709/204 |
| 2008/0183828 A1* | 7/2008 | Sehgal et al. | 709/206 |
| 2008/0207170 A1* | 8/2008 | Khetawat et al. | 455/411 |
| 2008/0256257 A1* | 10/2008 | Miller et al. | 709/238 |
| 2009/0082019 A1* | 3/2009 | Marsico | 455/435.2 |
| 2009/0187759 A1* | 7/2009 | Marsico | 713/155 |
| 2009/0210886 A1* | 8/2009 | Bhojwani et al. | 719/318 |
| 2010/0048228 A1 | 2/2010 | Harju et al. | 455/466 |
| 2010/0074154 A1* | 3/2010 | Astrom et al. | 370/310 |
| 2010/0173605 A1* | 7/2010 | Moraes | 455/408 |
| 2011/0159843 A1* | 6/2011 | Heath et al. | 455/411 |
| 2012/0203909 A1* | 8/2012 | Kavanaugh et al. | 709/226 |
| 2013/0144954 A1* | 6/2013 | Li et al. | 709/205 |
| 2013/0346444 A1* | 12/2013 | Makkar et al. | 707/770 |

* cited by examiner

COMMUNICATIONS SYSTEM

BACKGROUND OF THE INVENTION

The present invention relates to a system for facilitating message data communications. In particular, the invention relates to a system for reliably and swiftly transporting information bi-directionally between remote wireless communications devices connected to mobile networks, and service and application logic hosted at a separate location whilst minimising set up and maintenance overheads.

Currently systems such as Short Message Service (SMS) and General Packet Radio Service (GPRS) are used for message data communications. However these both have some drawbacks, namely:

SMS is a so-called "store and forward" service and hence can suffer from time delays in delivery depending upon load; consider the load, for instance, on New Year's Eve.

GPRS uses traffic channel resources in the network and hence can suffer time delays if the network has a high traffic load e.g. congestion, etc. GPRS is also inefficient for the transmission of small amounts of data and is less reliable than a signalling channel which, because of the importance of signalling channel data to the network, means that it has a higher probability of successfully being transported on the air interface under poor coverage conditions.

It has previously been proposed, to use Unstructured Supplementary Services Data (USSD) as a bearer technology to facilitate the transmission of data from a device to an information subsystem.

Using USSD as a bearer technology is not without complication. The communication must be securely controlled and coordinated to function as a communication method, particularly for telemetry or machine to machine communication technology.

Mobile networks are inherently service providers. Technologies such as SMS and GPRS provide mechanisms to facilitate end to end communication, i.e. the destination is easily identifiable from the individual message. The network operators can securely transfer the data between an originating device and an endpoint. This is not the case for USSD type communications. The destination in USSD messaging is generic for the service. Each message cannot be directed individually.

For USSD to be used as a bearer for machine to machine communications, endpoint operators must design and build individual and bespoke protocols for the machine to machine telemetry. They must design and program a device to work with their own bespoke protocol to send over the USSD bearer. All USSD messages designating that service must then be forwarded to them by the mobile networks.

Further, for an endpoint operator to use USSD as a bearer for machine to machine communications using conventional systems or a standardised messages service and limit the design and rollout of an individual protocol, they must be granted access to a secure portion of the network or access to the data stream for that message service. This is particularly insecure and highly undesirable in a modern business environment where a plurality of endpoint operators would require secure and easy access to the data transmitted from their originating devices.

SUMMARY OF THE INVENTION

According to a first aspect of the present invention, there is provided a system for facilitating communications over a telecommunications network, the system comprising a data communications device having a unique identifier, the device adapted to generate information elements comprising machine information, the information elements conforming to a first message protocol, the first message protocol being a session-based message protocol. The system further comprises a network subsystem to provide an interface for communication with a plurality of entities. The network subsystem is adapted to receive the information elements and extract the machine information, generate an output message comprising the machine information, the message conforming to a second message protocol different from the first message protocol, and, forward the message to a specific entity of the plurality of entities in dependence on the unique identifier of the data communications device. The data communications device may be a cellular data communications device.

By forwarding the message to a specific entity in dependence on the unique identifier, the system provides secure access to data from a particular device to the owner or service operator of the device remotely without compromising the data of other devices. Moreover, the system provides the operators with a common communication protocol such that the set up and maintenance overheads of machine to machine telemetry are significantly reduced. The problems identified above are obviated.

The network subsystem may comprise a network gateway and an application gateway. The network gateway may be adapted to: receive the information elements from the cellular data communications device, the information elements further comprising header information; generate an intermediate message comprising the machine information; and, forward the intermediate message to the application gateway in accordance with the header information.

The network gateway adds easy scalability to the system as multiple application gateways may be used with each message directed according to header information. Further, the network gateway provides for legacy messaging systems to function alongside the present system. Those messages meant for legacy systems and services will not be sent to the application gateway as they have different header information.

Additionally, the intermediate message comprises the unique identifier of the data communications device. Thus, the network subsystem, or application gateway, can interrogate the message to retrieve the unique identifier it uses to direct the machine information to the endpoint entity.

The application gateway may be further adapted to acknowledge receipt of the intermediate message from the network gateway, the acknowledgement being accompanied by a return message, and the network gateway, upon receipt of the return message, is adapted to forward the return message to the data communications device. Further, the application gateway may be adapted to receive the return message from the entity before acknowledging receipt of the intermediate message.

Two-way messaging is thus provided for. The handshaking process of the communications protocol is hijacked by the system to provide for two-way messaging between a remote operator and a remote device using a lightweight and low-cost protocol that overcomes the deficiencies of other message systems such as SMS and GPRS, the deficiencies of which are outlined above.

The network subsystem may be adapted to initiate a timer upon forwarding the output message to the entity, wherein if the timer reaches a predetermined value before the application gateway receives a return message from the entity, the application gateway adapted to accompany the acknowledgement with a blank return message. In this way, a hanging session is prevented from occurring by allowing the session of the communications protocol to continue if no message is received from the entity.

The application gateway may be adapted to store the received return message in a data store. The system can thus queue the messages for sending with the acknowledgement message. The entity does not need to retrieve the message to be sent immediately and the timer is not required to prevent a hanging session from occurring.

Additionally, the system may further comprise a database. The database may have associated within it the unique identifier and an address of the entity. The network subsystem may be adapted to retrieve from the database the address of the entity using the unique identifier and forward the output message to the entity at that address. An easy to maintain and independently updateable dataset is therefore provided. It can be updated independently of the application gateway and the application gateway can remotely retrieve the required information and associations.

The data communications device may have a second unique identifier. The system may further comprise a database having associated within it the unique identifier and an expected second unique identifier, the network subsystem being adapted to determine if the second unique identifier of the data communications device matches the expected second unique identifier associated with the unique identifier in the database. In this way, the security of the system is enhanced and the provisioning of the system is double checked before the data is sent to an incorrect destination. The provisioning of the system may not always be reliable and therefore by checking two unique identifiers, the provisioning reliability can be improved.

Further, the network subsystem may be adapted to send a configuration message to the data communications device upon receipt of the machine information from the device. The configuration message may, for example, indicate to the device the frequency of at which it should transmit messages. The network subsystem can update the configuration of the device remotely. In machine to machine applications this is particularly advantageous where a large number of devices may be mobile or inaccessible such that manual configuration by a skilled operator is simply inconceivable.

Additionally, the unique identifier may be selected from a group comprising: International Mobile Subscriber Identity (IMSI); International Mobile Equipment Identity (IMEI); Mobile Subscriber ISDN Number (MSISDN); and Integrated Circuit Card ID Number (ICCID). The system according may further comprise a sensor in communication with the data communications device, the sensor having an output, the data communications device being adapted to generate the machine information according to the sensor output. The first message protocol may be Unstructured Supplementary Service Data (USSD) and the second message protocol may be Simple Object Access Protocol (SOAP) or a web service that conforms to REST (Representational State Transfer) constraints, which is described as RESTful.

According to a second aspect of the present invention, there is provided a method for facilitating communications over a telecommunications network, the method comprising: receiving information elements comprising machine information from a data communications device having a unique identifier, the information elements conforming to a first message protocol, the first message protocol being a session-based message protocol; extracting the machine information; generating an output message comprising the machine information, the message conforming to a second message protocol different from the first message protocol; and, forwarding the message to a specific entity of a plurality of entities in dependence on the unique identifier of the data communications device. The data communications device may be a cellular data communications device.

The method may further comprise, at a network gateway: receiving the information elements from the data communications device, the information elements further comprising header information; generating an intermediate message comprising the machine information; and, forwarding the intermediate message to an application gateway in accordance with the header information. The intermediate message may comprise the unique identifier of the data communications device.

The method may also comprise: at the application gateway, acknowledging receipt of the intermediate message from the network gateway, the acknowledgement being accompanied by a return message; and, at the network gateway, upon receipt of the return message, forwarding the return message to the data communications device. The method may also comprise receiving a return message from the entity before acknowledging receipt of the intermediate message.

Additionally, the method may comprise initiating a timer upon forwarding the output message to the entity, wherein if the timer reaches a predetermined value before the application gateway receives a return message from the entity, accompanying the acknowledgement with a blank return message. The method may also comprise storing the received return message in a database.

Further, the method may comprise retrieving from a database the address of the entity using the unique identifier and forwarding the output message to the entity at that address.

The method may also comprise determining if a second unique identifier of the data communications device matches an expected second unique identifier associated with the unique identifier in a database, the database having associated within it the unique identifier and an expected second unique identifier. Further, the method may comprise sending a configuration message to the data communications device upon receipt of the machine information from the device.

The unique identifier may be selected from a group comprising: International Mobile Subscriber Identity (IMSI); International Mobile Equipment Identity (IMEI); Mobile Subscriber ISDN Number (MSISDN); and Integrated Circuit Card ID Number (ICCID). The method may also comprise generating machine information according to a sensor output, the sensor being in communication with the cellular data communications device. The first message protocol may be Unstructured Supplementary Service Data (USSD). The second message protocol may be Simple Object Access Protocol (SOAP) or a web service that conforms to REST (Representational State Transfer) constraints, which is described as RESTful.

According to a further aspect of the invention there is provided a network subsystem to provide an interface for communication with a plurality of entities, the network subsystem being adapted for use in the system of the first aspect of the invention.

According to another aspect of the invention there is provided an application gateway being adapted for use in the system of the first aspect of the invention.

DETAILED DESCRIPTION OF THE DRAWINGS

An example of the present invention will now be described in detail with reference to the accompanying drawings, in which.

DETAILED DESCRIPTION

USSD is defined in the 3GPP specifications to facilitate the transport of information from a remote wireless data communications device to a back-office element/capability. There are several benefits of using USSD to carry the information including, for example speed of delivery, reliability of delivery, efficient use of mobile network resources and the capability to establish a data session with the remote wireless communications device. Whilst the present invention is described in the context of USSD messaging, this is given merely as a preferred messaging protocol. Any suitable messaging protocol may be used with the present invention, preferably any suitable session based message protocol. Further, although the present invention is described as having a particularly useful application in machine to machine communications, it will be understood that the present invention has uses far beyond this scope. Further, although the present description is given in the context of a cellular data telecommunications network, it will be understood that the network need not be cellular in nature and that any suitable network may be used.

USSD is documented in the relevant 3GPP Standards (TS22.090, TS 23.090, TS24.090) relating to GSM and WCDMA networks. The USSD bearer works both when the remote wireless data communications device is in its home network (Home Private Land Mobile Network—HPLMN) and also when roaming onto a visited network (Visited Private Land Mobile Network—VPLMN) where suitable roaming agreements are in place. In both cases a suitable USSD Service Code (SC) will need to be defined or use made of a standardised USSD SC. This capability is clearly supported in the 3GPP standards and the method of the invention makes use of the appropriate SC number range such that the information is initially returned to the Home Location Register (HLR) and its receipt suitably acknowledged.

Whilst the data information passed via USSD initially arrives at the HLR it would ultimately be delivered to an information management subsystem where it could be stored or used in real-time to offer a service. In large cellular networks multiple HLRs/Home Subscriber Servers (HSSs) have to exist to enable information to be stored for all subscribers. The cost and complexity of modifying all these HLRs can be reduced by using a dedicated numbering range for such devices thus enabling fewer HLRs to be modified and/or a proxy server(s) inserted in front of the HLRs which can strip out the relevant information from such devices before it reaches the HLRs thus removing the need to modify them. Another way of reducing the impact on the HLRs is to use a SIM without an associated MSISDN as described in co-pending UK patent publication no. GB2459435.

The format of a USSD message is clearly defined in 3GPP standards (references provided above) and effectively consists of a header portion and a data/payload portion. Each portion is typically separated by an asterisk and the message terminated using a hash.

Assuming the serving network supports the feature, certain services can be provided locally by the serving network: for instance, by the VPLMN (in the case of a roamed subscriber). Certain other services can only be provided by the home network (HPLMN). The header portion of the USSD message is capable of identifying the service that the data/payload portion relates to and is standardised such that this header portion can identify whether the service should be available locally or only from the home network (HPLMN). In some cases the header portion may indicate that a service should be obtained from the home network irrespective of whether or not the serving network could provide that service.

In the core network, for example, in the location registers (HLRs, Visitor Location Registers (VLR), Mobile Switching Centres (MSC) etc.), the USSD messages are typically passed using the Mobile Application Part (MAP) which is an SS7 protocol that allows the location registers and other network entities to communicate with each other.

In conventional systems, a USSD Gateway may receive the USSD messages from the location register and route the USSD messages between the core network and service applications based upon the USSD service code. Typically, the USSD Gateway will receive a USSD message using the MAP layer from the core network and route the message using the short message peer-to-peer protocol (SMPP) to the service applications. The USSD message is then interpreted by the service application and a response transmitted back to the originating device if appropriate. The USSD Gateway keeps track of the session.

USSD messages are often used to provide services such as balance enquiries. In this example, the USSD message may be sent from the originating device to a network or service application based on the USSD service code. The service application will then check the balance of the device and transmit the balance to the device using SMS or other known communication types.

Figure 1:
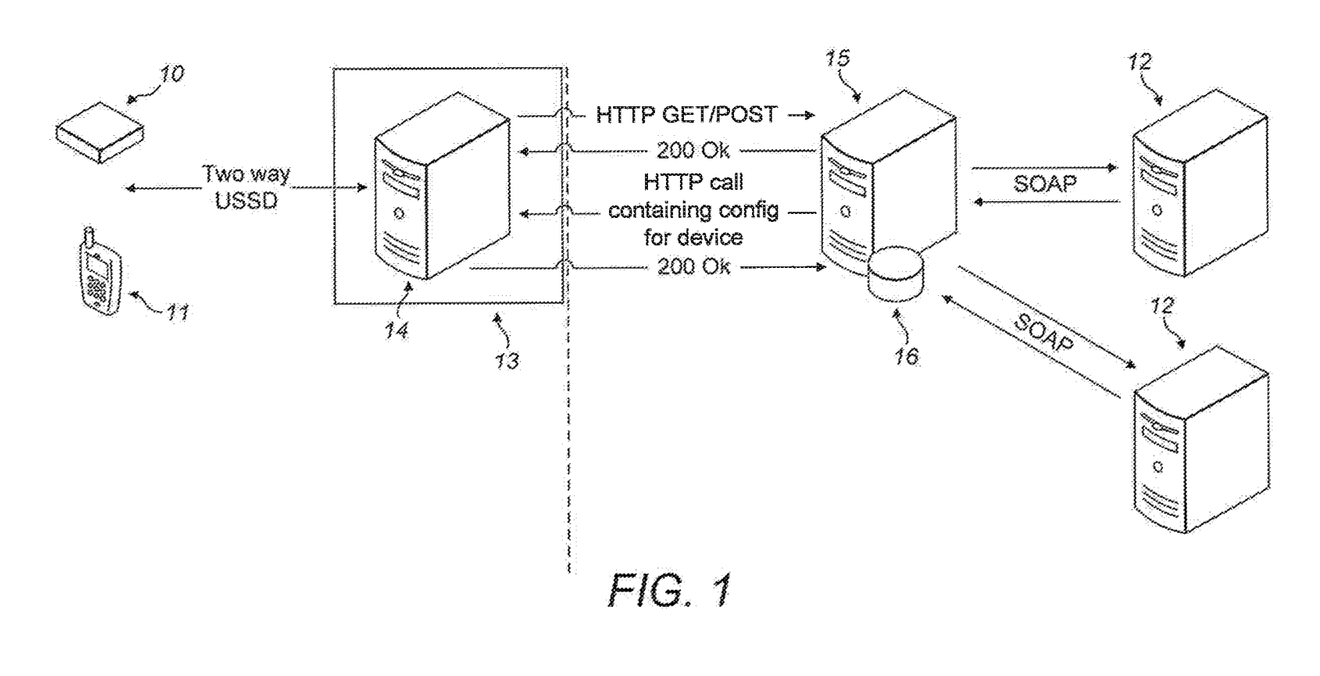
FIG. 1 shows a system suitable for implementing a first embodiment of the present invention.

A system suitable for implementing an embodiment of the present invention is illustrated in FIG. 1. A telecommunications device 10 is equipped with a SIM. SIMs are used to provide the relevant identification and authentication information for each device in telecommunications systems. Each SIM will be specific to a particular network (the "home" network)—that is, it will have been issued under the control of the operator of that network and will be for use within that network. SIMs are specific to the customers and carry information particular to each customer such as the customer's International Mobile Subscriber Identifier (IMSI) together with authentication information. Traditionally, the IMSI will be from a range of IMSIs assigned by an issuing authority, for example the International Telecommunications Union (ITU), to the service provider.

The device typically has an identifier of its own (the "International Mobile Equipment Identity", IMEI), which can be obtained in certain networks, however this identifier is not essential in identifying the owner to the network. The owner of the device is typically issued with a further, publicly known, number, that is, the owner's telephone number, by means of which calls to the owner are initiated by callers. This number is the mobile subscriber ISDN number (MSISDN), which may be provisioned to the SIM at any point after manufacture.

Throughout, where the device is referred to, it will be understood that the device includes the SIM. Anywhere it is mentioned that the device has a unique identifier, this unique identifier may be representative of the SIM or the device either singly or in combination.

The device 10 may be a remote wireless data communications device in conjunction with a corresponding sensing or actuation system either to measure or to provoke activity in the environment surrounding the remote device. The interfacing of the measurement and actuator type of unit(s) to the cellular device can be effected by a wired connection. Alternatively, it may make use of local short range wireless sensor network technology, such as RFID or ZigBee™.

A telecommunications device 11, i.e. a mobile telephone, may also used with the present invention. The telecommunications device is also equipped with a SIM.

The device 10 and telecommunications device 11 may utilise USSD or a similar session-based message protocol to send a payload comprising machine information to an endpoint entity 12, i.e. the home server of the originating device. The devices 10, 11 may utilise the sensing or actuating system to provide the machine information, examples of which include, but are not limited to location, temperature, meter readings etc.

The USSD message including the payload information is passed through the telecommunications network, in this case, the core network 13 which includes the home location register (HLR) 14. The header of the USSD message, i.e. the USSD SC, identifies the HLR, i.e. the network subsystem, or the application gateway 15 or both, that is to receive the USSD message. The HLR 14 passes the USSD message to an application gateway 15 and also authenticates the device. This will be described in more detail below. The machine information of the originating device 10 is sent to an endpoint entity 12 by the application gateway 15, in dependence on a unique identifier of the originating device. In this way, the endpoint entity 12 can receive the message securely from a device which does not have significant modifications and using a minimal amount of USSD SCs. The endpoint entity is typically embodied by a server.

The HLR 14 is illustrated in this instance as handling the communications between the device 10, 11 and the application gateway 15, however, it will be understood that any suitable known network architecture may be used in conjunction with the present invention. For example, the message may be passed to the HLR 14 by a Visitor Location Register (VLR).

The HLR 14 communicates with the application gateway 15 using the Hyper Text Transfer Protocol (HTTP). HTTP is a request/response network communications protocol defined by the Internet Engineering Task Force (IETF) and the World Wide Web Consortium (W3C). Further details can be found in RFC2612 (June 1999) which defines HTTP/1.1. HTTP is in wide use throughout telecommunication systems.

HTTP defines multiple request methods, two of which are described here to transfer information from the HLR to the application gateway. The HTTP POST method is the conventional method of transferring information from one entity to another. The message sent from the HLR 14 is acknowledged by the application gateway 15 using a '200 OK' response to the request containing the message. Other responses may be provided depending on the circumstances, in the conventional manner. The HTTP GET request method may be used to request information from the application gateway(s).

Figure 2:
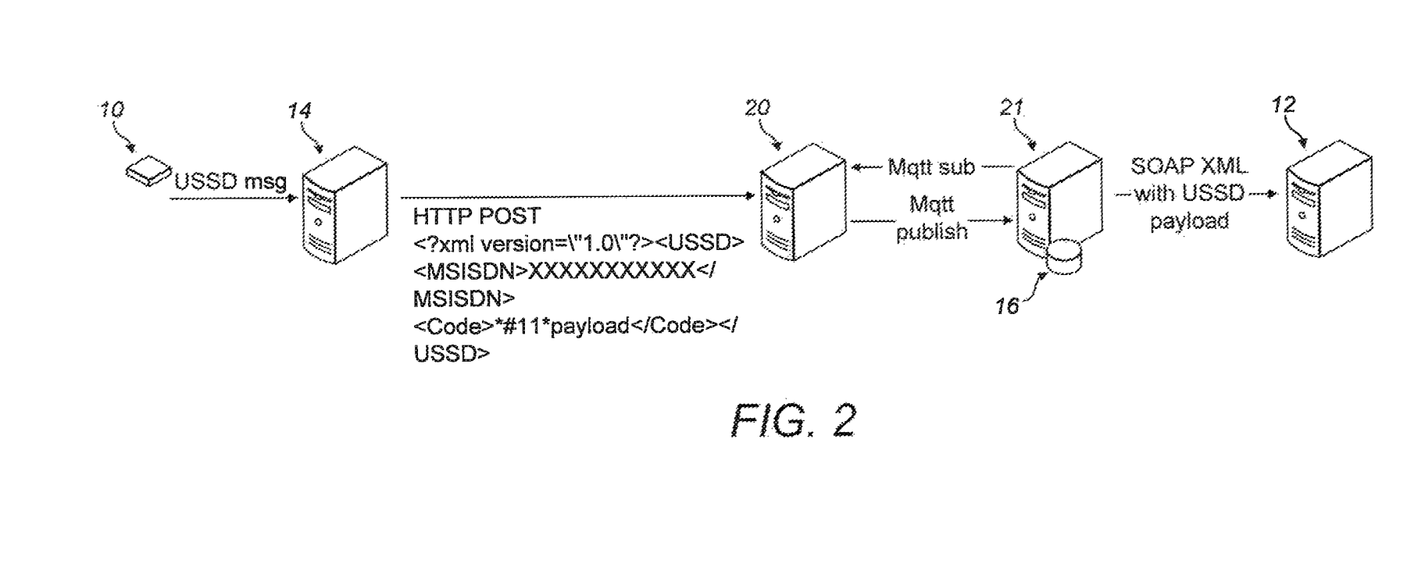
FIG. 2 shows a system suitable for implementing a second embodiment of the present invention.

In Extensible Markup Language (XML) format, the HLR 14, transfers the USSD message sent by the originating device to the application gateway. Along with the USSD message, the HLR 14 will send to the application gateway 15, one or more unique identifiers of the originating device 10, 11. This may be the MSISDN or IMEI associated with device or alternatively the IMSI of the SIM or a combination of these. FIG. 2 shows an exemplary message.

When the message is received by the application gateway 15, it interrogates a database 16 to extract information regarding the destination of the message. The database 16 may be internal or external to the application gateway 15. The database 16 contains a grouping of unique identifiers associated with the address of a particular endpoint. The address may be a Internet Protocol (IP) address, a fully qualified domain name (FQDN) or other suitable address.

The USSD payload is extracted from the USSD message. This act may be performed at the HLR 14 or at the application gateway 15. The HLR 14 may send the entire USSD message, or it may send the USSD payload only. The machine information for the originating device 10, 11 extracted from the USSD message is sent to the endpoint entity 12 associated with the range of unique identifiers in the database 16.

Figure 3:
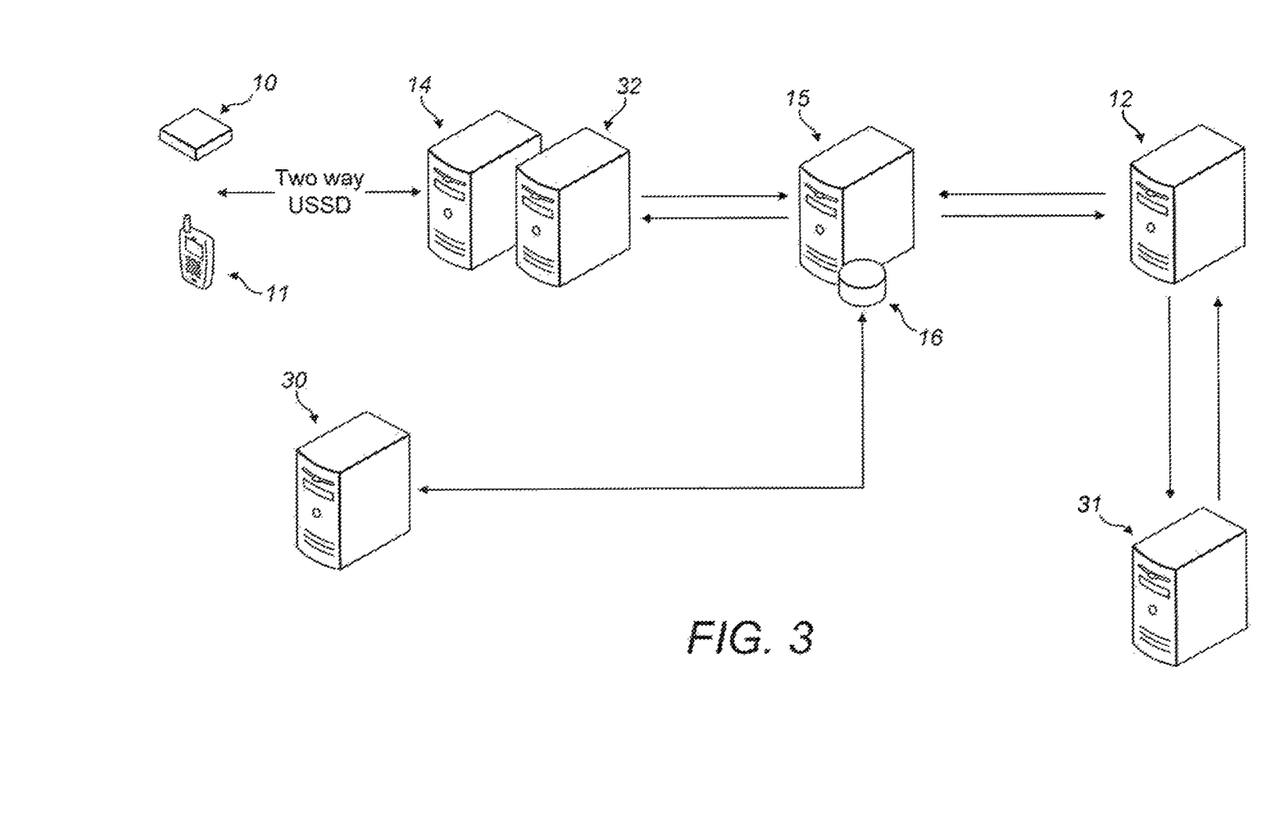
FIG. 3 shows a system suitable for implementing a third embodiment of the present invention having a service platform and an interpretation server.

It is contemplated that the HLR 14, described in this example as part of the network and carrying out many of the described features, may be in fact multiple entities. For example, the HLR may receive the message and pass it internally or securely externally to a gateway device which may be configured to extract the payload information and carry out other acts described herein as performed by the HLR. For example, as shown in FIG. 3, a USSD Gateway 32 may receive the USSD message from the HLR 14 and pass the payload to the application gateway 15 in dependence on the USSD service code, i.e. the USSD header information. The USSD gateway 32 will direct USSD messages having other USSD service codes to the service application corresponding to that USSD service code. This exemplary USSD Gateway functionality may equally be carried out by the HLR.

For additional security, a second unique identifier, described here as the IMEI of the device 10, 11 may also be transferred from the HLR 14 to the application gateway 15. The first unique identifier, in this case the IMSI, and IMEI may be cross-checked in the database to ensure that the originating device transmitting the message is sufficiently provisioned.

In summary, the following processes may be carried out by the application gateway 15 when a USSD message is received from the HLR 14:

1. Parse HTTP message for the IMSI, USSD payload and IMEI;
2. Retrieve IMSI for originating device and look up in database;
3. Check that the IMEI in the HTTP message matches that provisioned in the database;
4. Extract the record from the database to retrieve the customer ID and service ID. Using the service ID, identify the address of the endpoint; and,
5. Transfer the payload to the correct destination in accordance with the IMSI of the originating device. The endpoint destination then receives the USSD payload and may acknowledge receipt.

The message may be sent from the application gateway 15 to the endpoint entity 12 using the Simple Object Access Protocol (SOAP) or a web service that conforms to REST (Representational State Transfer) constraints, which is described as RESTful. Advantageously, these SOAP and RESTful messages are understood by a variety of devices and thus the endpoint entities require no significant adaptation. The USSD payload can be received and handled as appropriate.

The Simple Object Access Protocol (SOAP) is an Extensible Mark-up Language (XML) based protocol that uses application layer transfer protocols for message delivery such as HTTP which is described above. The SOAP specification is currently maintained by the XML Protocol Working Group of the World Wide Web Consortium (W3C). Each SOAP message is made up of an envelope encapsulating a header and a body. Although SOAP is described herein it is contemplated that other message protocols may be used in accordance with the present invention. SOAP provides a standardised interface between entities and therefore allows endpoint devices to interact with the described system without significant modification.

Each SOAP message may be encrypted using known methods. An example of which is transmitting the message using the application layer transfer protocol Hypertext Transfer Protocol Secure (HTTPS) or Secure Hypertext Transfer Protocol (S-HTTP). In this way, each endpoint entity, can securely access USSD payload messages from the originating device without significant modification and access to the telecommunications network. The security of the telecommunications network and data stream is uncompromised and messages from originating devices may be securely sent to the intended recipient without interception or common access.

As mentioned previously, it is envisaged that various and multiple security methods and message transfer protocols could be utilised.

The application gateway 15 may form a Web Service. A Web Service, is defined by the World Wide Web Consortium (W3C) as "a software system designed to support interoperable machine to machine interaction over a network. It has an interface described in a machine processable format (specifically Web Service Description Language WSDL). Other systems interact with the web service in a manner described by the description using SOAP messages, typically conveyed using HTTP with an XML serialisation in conjunction with other web related standards". By using a Web Service, the USSD payload can be transferred easily to a client entity where it can be understood without significant adaptation. Moreover, since the message is transferred only in accordance with the unique identifier of the originating device, the system is secure and reliable and the client entity does not require core network access or adaptation to allow for secure message transfer.

An application programming interface (API) defines a standardised set of rules or specifications for communication between multiple parties or software programs. In the presently described embodiment, the endpoint entity 12 software can be provided with a set of instructions or rules for communication with the application gateway 15 to receive the desired information or a set of rules or instructions for the formatting of messages to and from the originating device 10, 11 which may form the USSD payload. An API may be advantageous in the present situation since it provides a set of rules the endpoint server 12 can follow so that modifications to systems are straightforward, if required at all.

The endpoint system 12 may first have subscribed to the application gateway 15 to inform the application gateway 15 that it is ready to receive messages.

A second gateway may be provided (not shown) which stores the USSD payload and provides a web interface for remote retrieval of the USSD payload by a remote entity 12. This functionality may also be built into the application gateway 15. The message may not automatically be forwarded as described above but may be retrieved securely. Access may be restricted based on the unique identifier of the originating device 10, 11 and the address of the remote device 12 associated with it in the database 16.

As shown in FIG. 2, the tasks of the application gateway described above may be split. A first application gateway 20, may parse the HTTP message to retrieve the unique identifier and the appropriate payload from the USSD message. It may then publish the USSD payload and customer ID on an MQTT topic. A second gateway 21, or front end, may subscribe using MQTT to retrieve the USSD payloads. It may then filter the message retrieved, look up the MSISDN in a database 16, extract the relevant customer ID and service ID and forward the message, using SOAP or a suitable format, to a endpoint entity 12 or store for retrieval as described above.

The MQ Telemetry Transport (MQTT) protocol is a publish/subscribe communication model. In a publish/subscribe communications system, the messages are not programmed to be sent to a particular recipient from a publisher. Indeed the publisher need not require any knowledge of the subscribers. Although MQTT is described as utilised herein, it should be understood that any suitable communication method may be used. It should be understood in particular that a publish/subscribe communications protocol need not be used. It is contemplated, for example, that a message queue system may be used or, as described elsewhere herein, an HTTP messaging system.

The originating device 10 may receive a configuration message in response to the USSD message sent to the network. This may be transmitted by the network, i.e. the HLR 14, in response to the first USSD message received by the HLR 14. The configuration message may be used for a variety of purposes. For example, the configuration message may instruct the device to vary the frequency of telemetry and message transmittal to the home server 12. The configuration may also, for example, update the time and date of the device 10, 11. Other configuration messages are of course envisaged.

The configuration message may also originate from the application gateway 15, rather than the HLR 14. For example, an HTTP XML message containing a configuration may be sent from the application gateway 15 to the HLR 14 in response to an HTTP request sent by the HLR 14 indicating that a USSD message has been received by the HLR 14. The HLR 14 will respond to the request to using '200 OK' to acknowledge receipt of the message and will then transfer the message in response to the original USSD message received from the originating device 10, 11 by the HLR 14.

The system may be provisioned in a variety of ways. For example, the endpoint entity 12 may subscribe using SOAP messages to a particular range of IMSIs or unique identifiers. The database 16 may then be updated so that the future messages are forwarded or stored for retrieval by that endpoint entity 12. The IMSI database 16, or unique identifier database 16, may also be provisioned securely from an external or network service platform 30 as shown in FIG. 3.

A separate interpretation server 31 may be also be provided to aid in the interpretation of the machine information transmitted from the originating device 10, 11 using USSD. One of the advantages of USSD is its lightweight construction. Therefore, a limited amount of information may be contained in the USSD message. An exemplary implementation of this is shown in FIG. 3. Should the USSD message contain the CellID that the device 10, 11 is connected to, an external interpretation server may be provided to translate this CellID into rough geographic location information. The endpoint entity 12 may also not have access to confidential information to interpret the machine information. The interpretation server 31 may interpret other machine information as well as the exemplary CellID.

The server 31 may be in communicative contact with either the endpoint entity 12 to interpret the information once it has been received or in communicative contact with the application gateway 15 to translate the information before transmittal (not shown). It should be understood that the interpretation server 31, as named, may perform similar or analogous services such as supplementing the machine information received from the originating device 10, 11.

It has previously been described that configuration messages may be sent from the HLR or application gateway to the originating device in response to the USSD message sent from the device to the core network. A system for facilitating two-way transmittal of messages from the client entity to the originating device will now be described.

Although network initiated USSD messages are described in the 3GPP specifications, many network operators choose to disable this feature and many devices 10, 11 are not equipped or suitable for handling these messages. The methods described below provide a simple, secure and effective method of transferring a message from the endpoint entity to the originating device without detailed access and knowledge of a mobile network.

Figure 4:
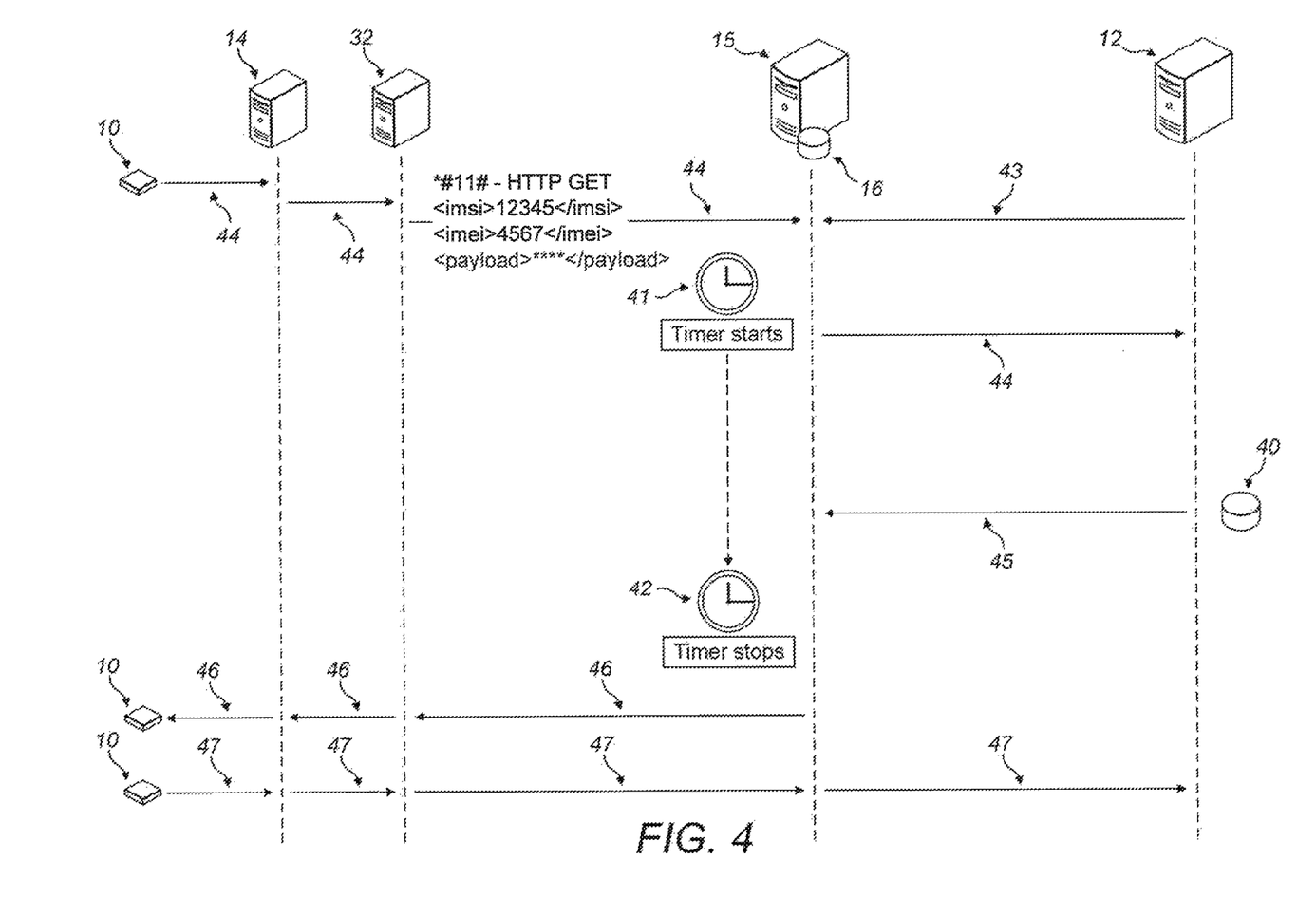
FIG. 4 shows a process suitable for implementing two-way USSD communication in accordance with a fourth embodiment of the present invention; and, FIG. 5 shows an alternative process suitable for implementing two-way USSD communication in accordance with a fifth embodiment of the present invention.

FIG. 4 illustrates a first implementation of two-way messaging. A USSD message may be transmitted to an application gateway 15 in the manner described above (step 44). It is described above that an HTTP GET request may be used to send the message from the core network 13 to the application gateway 15, although other suitable methods may be used.

In one embodiment, the application gateway 15 will pass the machine information to the endpoint entity 12 in the manner described above (step 44) and will then wait before acknowledging receipt of the machine information to the network 13. The endpoint entity 12 may first subscribe to the application gateway 15 (step 43). If the endpoint entity 12 gives the application gateway 15 a message to pass to the originating device 10, 11 via the network 13, the application gateway 15 attaches this to the acknowledgement, i.e. '200 OK', sent to the network 13.

When the application gateway 15 sends the payload to the endpoint entity 12, it starts a timer (step 41). The endpoint entity 12, upon receipt of the message from the application gateway, may return a message to be forwarded to the device. The return message may, for example, include configuration data. If no message is received from the endpoint entity 12 for forwarding within a predetermined time limit, a '200 OK' response is sent to the HLR 14 (via a USSD gateway 32 if present) with a blank message. The endpoint entity 12 may have stored the return message in a store 40 before sending. If the return message is received by the application gateway 15 before the timer runs out (step 42), i.e. within the predetermined time limit, the message will be sent to the HLR accompanying the '200 OK' response (step 46).

The HLR 14 (or USSD gateway 32 if present) will then interrogate the response and extract the message to be sent to the originating device 10, 11 in response to the USSD message. If requested, the originating device will acknowledge receipt using a USSD ACK message (step 47). The timer prevents a hanging HTTP session from occurring in the event of an unresponsive endpoint entity.

The message sent to the originating device may include, for example, handshaking or security information. The application gateway 15 may only transmit the message to the originating device 10, 11 if it is from the endpoint entity 12 that is associated with the IMSI, or unique identifier, of the originating device 12 in the database and the endpoint device currently has a valid subscription in force. In the same manner as the transmission of messages from the application gateway 15 to the endpoint entity 12, a web service API, a web interface or SOAP method or combination may be used.

Figure 5:
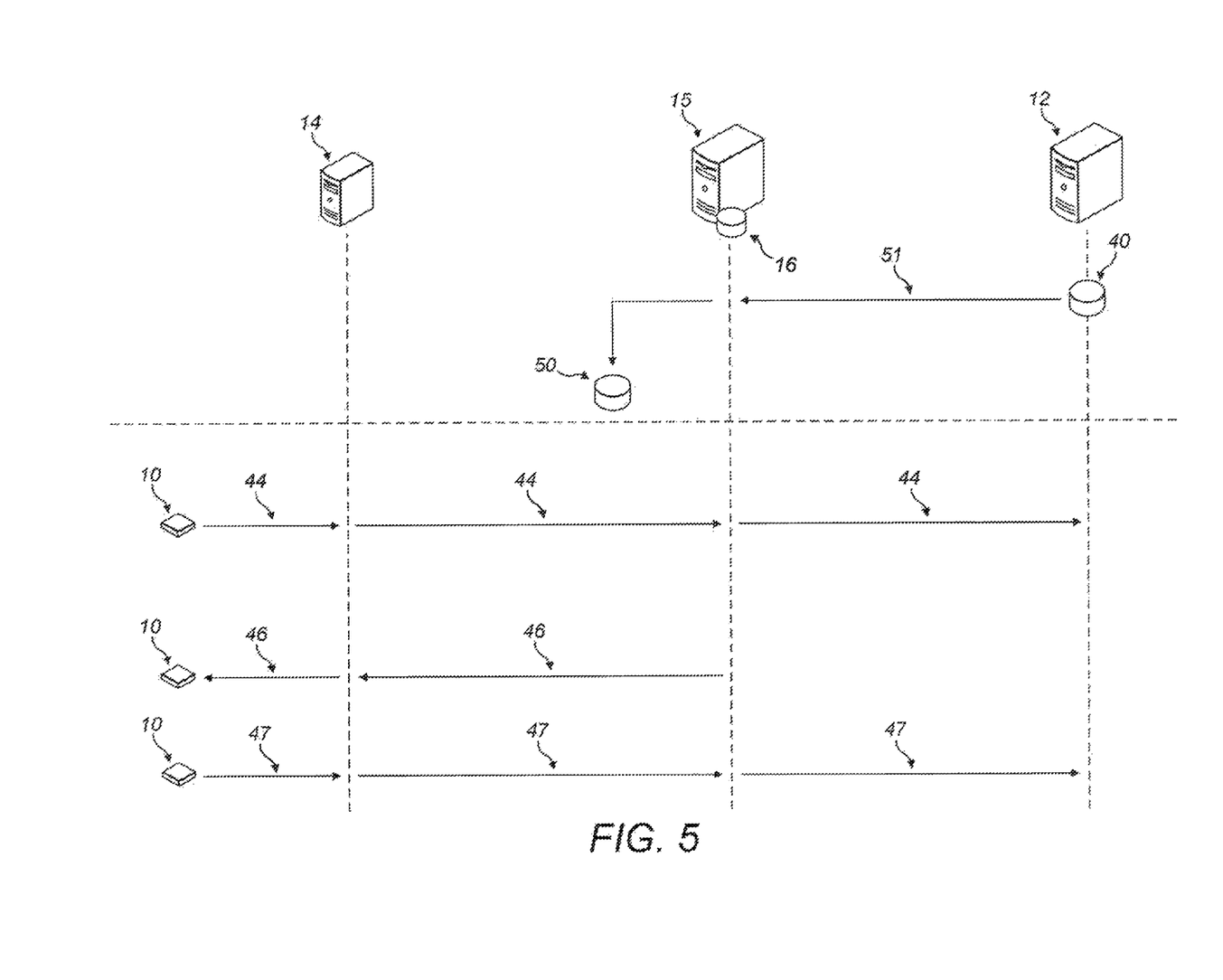

FIG. 5 illustrates an alternative method of transmitting two-way messages using USSD. This architecture may be described as a single "queue architecture". In this queue architecture, the application gateway 15 has associated with it a corresponding message store 50. Messages may be sent from the endpoint entity 12 to the application gateway 15 to be sent to the originating device at any time (step 51). The messages are stored by the application gateway. A message may only be considered if it satisfies certain security criteria, a few of which are described above.

The messages stored form a queue of messages to be sent to the originating device 10, 11. When a USSD message is received by the application gateway 15 from the originating device 10, 11 in the manner described above (step 44), the application gateway 15 checks the message queue 50. If there are any messages to be sent to the originating device 10, 11, i.e. associated with the originating device, the message is transmitted in response to the USSD message received from the HLR 14 or USSD gateway 32 if present and accompanying an acknowledgement of that message.

If no message exists, a blank acknowledgement may be sent to the HLR 14 or the USSD gateway if present. The message transmittal to the endpoint entity 12 is then carried out as described above. At the HLR 14, when the message is received from the application gateway 15, it is transmitted to the originating device 10, 11 in response to the USSD message received (step 46). If requested, the originating device 10, 11 will acknowledge receipt using a USSD ACK message (step 47).

It is contemplated that the two two-way messaging examples described above may be combined. For example, the application gateway 15 may check its message store or queue 50. If no message exists, it may initiate the timer 41. If no message has been received from the endpoint by the time the timer expires 42, only then might the application gateway 15 forward a blank message with the acknowledgement to the HLR 14.

It should of course be understood that although the message protocols described herein may be suitable for use with the principles of the present invention, it will be understood that alternative message protocols will be contemplated and are suitable for use with the present invention.

Further, although the above has been described in relation to a mobile device, it will be understood that the machine-to-machine (M2M) implementation of a SIM described in WO 2009/122212 or WO 2009/122219, in which no MSISDN is required for full device functionality, may be implemented with this invention. While terminals and devices are often referred to as "mobile" in the preceding discussion the term "mobile" should not be construed to require that a terminal or device always be mobile, merely that it has the capability of being in communication with a wireless telecommunications network which allows mobility. For instance, a PC terminal or a M2M client that is never moved from a particular geographic location may in a sense still be considered mobile as it could be moved to a different location yet still access the same network. Where the term mobile terminal or device is used in the present discussion it is to be read as including the possibility of a terminal that is "semi-permanent" or even "fixed" where the context does not contradict such an interpretation.

Unless the context in which it is described implies to the contrary, the networks described herein may be both 'mobile networks' and 'mobile virtual networks' operated by MNOs (Mobile Network Operators) and MVNOs (Mobile Virtual Network Operators), respectively. An MVNO may hold limited licences and operate a limited amount of network components. It should be understood that the present invention is applicable to both mobile networks and mobile virtual networks equally. Further, although many of the networks that may make use of the present invention will be cellular, this need not always be the case.

The invention claimed is:

1. A system for facilitating communications over a telecommunications network, the system comprising:
a data communications device having a unique identifier, the device adapted to:
generate information elements comprising machine information, the information elements conforming to a first message protocol, the first message protocol being a session-based message protocol; and
a network subsystem to provide an interface for communication with a plurality of entities, the network subsystem adapted to:
receive the information elements and extract the machine information,
generate an output message comprising the machine information, the message conforming to a second message protocol different from the first message protocol, and
forward the message to a specific entity of the plurality of entities in dependence on the unique identifier of the data communications device,
wherein the network subsystem comprises a network gateway and an application gateway, the network gateway adapted to:
receive the information elements comprising machine information from the data communications device, the information elements conforming to a first message protocol, the first message protocol being a session-based message protocol.

2. A system according to claim 1, in which the information elements further comprise header information, and
the network gateway is further adapted to:
generate an intermediate message comprising the machine information, and
forward the intermediate message to the application gateway in accordance with the header information.

3. A system according to claim 2, in which the application gateway is adapted to acknowledge receipt of the intermediate message from the network gateway, the acknowledgement being accompanied by a return message, and the network gateway, upon receipt of the return message, is adapted to forward the return message to the data communications device.

4. A system according to claim 3, in which the network subsystem is adapted to initiate a timer upon forwarding the output message to the entity, wherein if the timer reaches a predetermined value before the application gateway receives a return message from the entity, the application gateway adapted to accompany the acknowledgement with a blank return message.

5. A system according to claim 1, further comprising a database, the database having associated within it the unique identifier and an address of the entity,
wherein the network subsystem is adapted to retrieve from the database the address of the entity using the unique identifier and forward the output message to the entity at that address.

6. A system according to claim 1, in which the data communications device has a second unique identifier, the system further comprising a database having associated within it the unique identifier and an expected second unique identifier, the network subsystem being adapted to determine if the second unique identifier of the data communications device matches the expected second unique identifier associated with the unique identifier in the database.

7. A system according to claim 1, in which the network subsystem is further adapted to send a configuration message to the data communications device upon receipt of the machine information from the device.

8. A system according to any preceding claim, in which the unique identifier is selected from a group comprising: International Mobile Subscriber Identity (IMSI); International Mobile Equipment Identity (IMEI); Mobile Subscriber ISDN Number (MSISDN); and Integrated Circuit Card ID Number (ICCID).

9. A system according to claim 1, further comprising a sensor in communication with the data communications device, the sensor having an output, the data communications device being adapted to generate the machine information according to the sensor output.

10. A system according to claim 1, in which the first message protocol is Unstructured Supplementary Service Data (USSD).

11. A system according to claim 1, in which the second message protocol is Simple Object Access Protocol (SOAP) or a web service that conforms to REST (Representational State Transfer) constraints, which is described as RESTful.

12. A system according to claim 1 in which the data communications device is a cellular data communications device.

13. A method for facilitating communications over a telecommunications network, the method comprising: receiving at a network gateway information elements comprising machine information from a cellular data communications device having a unique identifier, the information elements conforming to a first message protocol, the first message protocol being a session-based message protocol; extracting the machine information; generating an output message comprising the machine information, the message conforming to a second message protocol different from the first message protocol; and forwarding the message to a specific entity of a plurality of entities in dependence on the unique identifier of the data communications device, wherein the network subsystem comprises a network gateway and an application gateway, the network gateway adapted to: receive the information elements comprising machine information from the data communications device, the information elements conforming to a first message protocol, the first message protocol being a session-based message protocol.

14. A method according to claim 13, in which the information elements further comprise header information, and
the method further comprises at a network gateway:
generating an intermediate message comprising the machine information, and
forwarding the intermediate message to an application gateway in accordance with the header information.

15. A method according to claim 14, in which the intermediate message comprises the unique identifier of the data communications device.

16. A method according to claim 13, further comprising retrieving from a database the address of the entity using the unique identifier and forwarding the output message to the entity at that address.

17. A method according to claim 13, further comprising determining if a second unique identifier of the data communications device matches an expected second unique identifier associated with the unique identifier in a database, the database having associated within it the unique identifier and an expected second unique identifier.

18. A method according to claim 13, further comprising sending a configuration message to the data communications device upon receipt of the machine information from the device.

19. A network subsystem to provide an interface for communication with a plurality of entities, the network subsystem being used in the system of claim 1.

20. An application being used in the system of claim 2.

* * * * *